US009856346B2

(12) United States Patent
Sheen et al.

(10) Patent No.: US 9,856,346 B2
(45) Date of Patent: Jan. 2, 2018

(54) LIGNIN-BASED BIOMASS EPOXY RESIN, METHOD FOR MANUFACTURING THE SAME, AND COMPOSITIONS INCLUDING THE SAME

(71) Applicant: INDUSTRIAL TECHNOLOGY RESEARCH INSTITUTE, Hsinchu (TW)

(72) Inventors: Yuung-Ching Sheen, Hsinchu (TW); Yi-Ting Wang, Taichung (TW); Su-Mei Chen Wei, Hsinchu (TW); Yi-Che Su, Zhubei (TW); Wen-Pin Chuang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 57 days.

(21) Appl. No.: 14/879,871

(22) Filed: Oct. 9, 2015

(65) Prior Publication Data
US 2016/0102170 A1 Apr. 14, 2016

(30) Foreign Application Priority Data

Oct. 14, 2014 (TW) .............................. 103135456 A
Jun. 10, 2015 (TW) .............................. 104118709 A

(51) Int. Cl.
| | |
|---|---|
| *C08H 7/00* | (2011.01) |
| *C08H 8/00* | (2010.01) |
| *C08G 59/16* | (2006.01) |
| *C08G 59/42* | (2006.01) |
| *C08G 59/02* | (2006.01) |
| *C08G 59/40* | (2006.01) |
| *C08K 3/00* | (2006.01) |
| *C08K 5/00* | (2006.01) |
| *C08K 9/04* | (2006.01) |
| *C08L 97/00* | (2006.01) |
| *C08L 63/00* | (2006.01) |
| *C09D 163/00* | (2006.01) |
| *C09D 197/00* | (2006.01) |
| *C08G 59/06* | (2006.01) |

(52) U.S. Cl.
CPC ....... *C08G 59/1455* (2013.01); *C08G 59/027* (2013.01); *C08G 59/06* (2013.01); *C08G 59/42* (2013.01); *C08H 6/00* (2013.01); *C08H 8/00* (2013.01); *C08K 3/0016* (2013.01); *C08K 5/0025* (2013.01); *C08K 9/04* (2013.01); *C08L 97/005* (2013.01)

(58) Field of Classification Search
CPC ..... C08G 59/00–59/72; C08G 59/1455; C08L 63/00–63/10; C08L 97/00; C09D 163/00–163/10; C09D 197/00; C09J 163/00–163/10; C09J 197/00; C08H 6/00; C08H 8/00
See application file for complete search history.

(56) References Cited

U.S. PATENT DOCUMENTS

| | | | |
|---|---|---|---|
| 4,017,474 | A | 4/1977 | Glasser et al. |
| 4,087,407 | A | 5/1978 | Blount |
| 4,235,974 | A | 11/1980 | Blount |
| 4,292,413 | A | 9/1981 | Blount |
| 4,304,877 | A | 12/1981 | Blount |
| 4,323,494 | A | 4/1982 | Blount |
| 4,324,864 | A | 4/1982 | Blount |
| 4,328,136 | A | 5/1982 | Blount |
| 4,547,224 | A | 10/1985 | Schilling |
| 4,861,377 | A | 8/1989 | Schilling |
| 4,957,560 | A | 9/1990 | Schilling |
| 4,994,508 | A | 2/1991 | Shiraki et al. |
| 5,073,297 | A | 12/1991 | Schilling |
| 5,093,416 | A | 3/1992 | Blount |
| 5,348,621 | A | 9/1994 | Rudy |
| 5,959,016 | A | 9/1999 | Schmidt et al. |
| 6,284,838 | B1 | 9/2001 | Silbiger |
| 8,273,515 | B2 | 9/2012 | Ariyoshi et al. |
| 8,409,403 | B2 | 4/2013 | Blount |
| 8,420,766 | B2 | 4/2013 | Okabe et al. |
| 8,674,079 | B2 | 3/2014 | Gonda et al. |
| 2003/0157268 | A1 | 8/2003 | Gutowski et al. |
| 2010/0124441 | A1 | 5/2010 | Ariyoshi et al. |
| 2011/0024168 | A1 | 2/2011 | Okabe et al. |
| 2011/0098384 | A1 | 4/2011 | Blount |

(Continued)

FOREIGN PATENT DOCUMENTS

| | | |
|---|---|---|
| CN | 101348558 A | 1/2009 |
| CN | 101724136 A | 6/2010 |

(Continued)

OTHER PUBLICATIONS

Toledo et al., "Calcium Lignosulfonate (40-65) Chemical and Technical Assessment" prepared for 69th JECFA (2008).*
Taiwanese Office Action and Search Report, dated Dec. 23, 2015, for Taiwanese Application No. 104118709.
Extended European Search Report, dated Feb. 2, 2016, for European Application No. 15189620.6.
El Mansouri et al., "Synthesis and Characterization of Kraft Lignin-Based Epoxy Resins", BioResources, vol. 6, No. 3, 2011, pp. 2492-2503.
Hu et al., "Synthesis of Straw Alkaline Lignin-based Epoxy Resin", Journal of Northeast Forestry University, vol. 35, No. 4, Apr. 2007, pp. 53-55.

(Continued)

*Primary Examiner* — Kregg T Brooks
(74) *Attorney, Agent, or Firm* — Birch, Stewart, Kolasch & Birch, LLP

(57) ABSTRACT

A method of forming a lignin-based biomass epoxy resin is provided, which includes: (a) mixing a lignin, an acid anhydride compound, and a solvent to react for forming a first intermediate product, (b) reacting the first intermediate compound with a first polyol to form a second intermediate compound, and (c) reacting the second intermediate compound with an epoxy compound to form a lignin-based biomass epoxy resin.

6 Claims, No Drawings

(56) References Cited

U.S. PATENT DOCUMENTS

| | | |
|---|---|---|
| 2012/0077725 A1 | 3/2012 | Wang et al. |
| 2012/0148740 A1 | 6/2012 | Yang et al. |
| 2012/0184701 A1 | 7/2012 | Kubo et al. |
| 2012/0277349 A1* | 11/2012 | Hsieh .............. C08L 97/005 523/461 |
| 2012/0302699 A1 | 11/2012 | Kobune et al. |
| 2013/0210967 A1 | 8/2013 | Krueger et al. |
| 2013/0287993 A1 | 10/2013 | Williamson et al. |
| 2013/0289191 A1 | 10/2013 | Williamson et al. |
| 2013/0303667 A1 | 11/2013 | Cao et al. |
| 2013/0303711 A1 | 11/2013 | Cao et al. |
| 2013/0303738 A1 | 11/2013 | Cao et al. |
| 2013/0338347 A1 | 12/2013 | Cao et al. |
| 2014/0090577 A1 | 4/2014 | Sniady et al. |
| 2014/0094562 A1 | 4/2014 | Hagiopol et al. |
| 2014/0235811 A1 | 8/2014 | Yang et al. |

FOREIGN PATENT DOCUMENTS

| | | |
|---|---|---|
| CN | 101851429 A | 10/2010 |
| CN | 102558507 A | 7/2012 |
| JP | 2006-28528 A | 2/2006 |
| JP | 2008-77377 A | 4/2008 |
| JP | 2013-18822 A | 1/2013 |
| TW | 201141954 A1 | 12/2011 |
| TW | 201224012 A1 | 6/2012 |
| TW | I445740 B | 7/2014 |

OTHER PUBLICATIONS

Malutan et al., "Contribution to the Study of Hydroxymetylation Reaction of Alkali Lignin", BioResources, vol. 3, No. 1, 2008, pp. 13-20.

Malutan et al., "Lignin Modification by Epoxidation", BioResources, vol. 3, No. 4, 2008, pp. 1371-1376.

Zhao et al., "Synthesis and Characterization of Lignin Base Epoxy Resin", Journal of Cellulose Science and Technology, vol. 8, No. 4, Dec. 2000, pp. 19-26.

Zhao et al., "Synthesis of lignin base epoxy resin and its characterization", Journal of Materials Science Letters, vol. 20, 2001, pp. 859-862.

* cited by examiner

LIGNIN-BASED BIOMASS EPOXY RESIN, METHOD FOR MANUFACTURING THE SAME, AND COMPOSITIONS INCLUDING THE SAME

CROSS REFERENCE TO RELATED APPLICATIONS

This application is based upon and claims the benefit of priority from the prior Taiwan Patent Application No. 103135456 filed on Oct. 14, 2014, and claims priority of Taiwan Patent Application No. 104118709, filed on Jun. 10, 2015, the entire contents of which are incorporated herein by reference.

TECHNIQUE FIELD

The disclosure relates to lignin-based biomass epoxy resins, and in particularly it relates to methods of manufacturing the same.

BACKGROUND

Gasoline supplement is running dry, such that the gasoline costs are rising. Production, usage, and waste of gasoline products are not environmentally friendly and result in a lot of carbon dioxide and pollutants. As such, plant type and bio-based materials is a major area being developed for replacing gasoline materials which are used as raw materials in critical industries. In plants, the reserve of lignin is after cellulose. A lignin source can be straw, pulp black liquor, wood flour, lumber, or any plants. According to methods of obtaining the lignin, the lignin can be classified to alkali lignin, organosolv lignin, lignosulfonate, and the likes. Compared to other lignins, alkali lignin can be obtained from pulp black liquor and is cheap and stably sourced lignin material around. Currently, lignin is applied in additives, dispersant, and for organic synthesis, wherein lignin-based epoxy resins are mainly formed.

SUMMARY

In one embodiment, a method for manufacturing a lignin-based biomass epoxy resin comprises: (a) mixing a lignin, an acid anhydride compound, and a solvent to react for forming a first intermediate product; (b) reacting the first intermediate product with a first polyol to form a second intermediate product; and (c) reacting the second intermediate product with an epoxy compound to form the lignin-based biomass epoxy resin.

In one embodiment, a method for manufacturing the lignin-based biomass epoxy resin comprises: (a) mixing a lignin, an acid anhydride compound, a solvent, and a polyol to react for forming an intermediate product, wherein the lignin and the polyol have a weight ratio between 1:0.05 and 1:3, and the polyol comprises diol, triol, or a combination thereof; and (b) reacting the intermediate product with an epoxy compound to form the lignin-based biomass epoxy resin.

In one embodiment, a lignin-based biomass epoxy resin has a chemical formula:

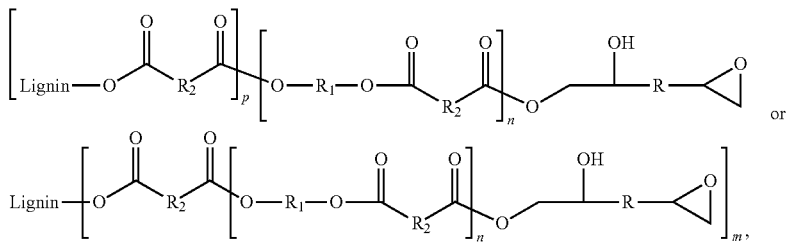

wherein Lignin is lignin; R is —$CH_2OCH_2$—, —$CH_2O(CH_2)_2OCH_2$—, —$CH_2O(CH_2)_4OCH_2$—,

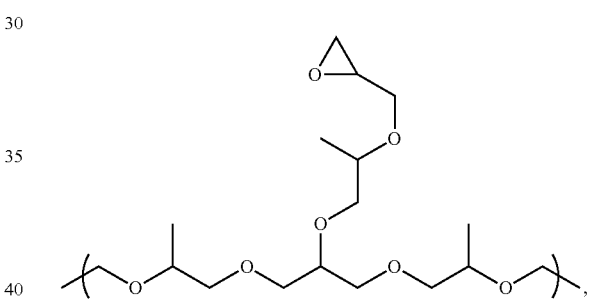

epoxidized soybean oil group, or a combination thereof; $R_1$ is $C_{2-8}$ alkanediyl group, —$C_{3-8}$ hydroxyl alkanediyl group, or a combination thereof; $R_2$ is —CH=CH—,

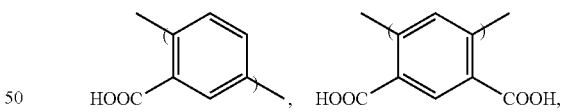

or a combination thereof; m is an integer from 1 to 10; n is an integer from 0 to 20; and, p is an integer from 1 to 5.

A detailed description is given in the following embodiments.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

In some embodiments, a method for manufacturing the lignin-based biomass epoxy resin is provided. First, (a)

mixing the lignin, the acid anhydride compound, and the solvent to react for forming a first intermediate product. In one embodiment, the lignin can be kraft lignin, lignosulfonate, organosolv lignin, or a combination thereof, and the lignin has a repeat unit represented by formula as:

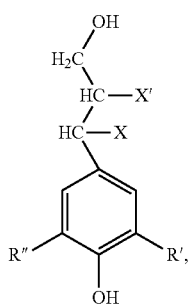

wherein R' and R" are independently $OCH_3$ or H; X is $SO_3M$ or H, M is alkali metal element; and X' is SH or H.

In the embodiments, the acid anhydride compound comprises maleic anhydride, 1,2,4,5-benzenetetracarboxylic anhydride, trimellitic anhydride, derivatives thereof, or a combination thereof. The hydroxyl group of lignin can react with the acid anhydride compound to form a carboxylic acid group. Further, the end carboxylic acid group can react with a hydroxyl group of the polyol, and another hydroxyl group of the polyol can react with another acid anhydride compound to form another carboxylic acid group via esterification reaction. It should be noted that the acid anhydride compound would remain some unreacted carboxylic acid groups and the polyol would remain some unreacted hydroxyl groups after the reaction. The lignin and the acid anhydride compound may have a weight ratio between 1:0.1 and 1:6.5. An overly high amount of the acid anhydride compound may influence the subsequent epoxidation reforming reaction. An overly low amount of the acid anhydride compound may cause poor epoxidation of the lignin.

Next, (b) reacting the first intermediate product with the first polyol to form a second intermediate product. In one embodiment, the lignin and the first polyol have a weight ratio between 1:0.1 and 1:2. An overly high amount of the first polyol may cause too few of the carboxylic acid groups remained in lignin molecular structure, so that may influence the subsequent epoxidation reforming reaction. An overly low amount of the first polyol may cause too many of the carboxylic acid groups remained in lignin molecular structure which may lead the second intermediate product gel easily, thereby the subsequent epoxidation reforming reaction will be failed. In one embodiment, the first polyol comprises diol, triol, or a combination thereof. Because of the first polyol being added in the step (b), which is after the step (a). The first polyol would not affect the reaction between the lignin and the acid anhydride compound in the step (a).

Next, (c) reacting the second intermediate product with the epoxy compound to form the lignin-based biomass epoxy resin. In one embodiment, the epoxy compound have plurality epoxy groups, such as glycidyl ether, diglycidyl ether, bisphenol A diglycidyl ether, epoxidized vegetable oil, derivatives thereof, or a combination thereof. In one embodiment, the lignin and the epoxy compound have a weight ratio of 1:0.7 to 1:5. An overly high amount of the epoxy compound may cause incomplete crosslinking unless adding extra hardener in the coating composition. An overly low amount of the epoxy compound may reduce the epoxidation modification which may lead degrading of the properties of the coating.

Alternatively, the composition of the step (a) may dissolve incompletely and some particles remained, therefore taking a portion amount of the first polyol from the step (b) (as mentioned above), which serves as the second polyol, to add to the composition to enhance dissolution. In the embodiment, the amount of the lignin and the second polyol of the step (a) have a weight ratio between 1:0.3 and 1:0.9, and the amount of the lignin and the first polyol of the step (b) have a weight ratio between 1:0.1 and 1:0.7. The second polyol comprises diol, triol, or a combination thereof. An overly low amount of the second polyol will be unhelpful dissolving the composition.

Alternatively, the composition of the step (a) dissolves incompletely, therefore taking all amount of the first polyol from the step (b) (as mentioned above), which serves as the second polyol, to add to the composition to enhance dissolution and omitting the step (b). For example, the steps adjusted includes: (a) mixing a lignin, an acid anhydride compound, a solvent, and a polyol to react for forming an intermediate product, wherein the lignin and the polyol have a weight ratio between 1:0.05 and 1:3, and the polyol comprises diol, triol, or a combination thereof; and (b) reacting the intermediate product and an epoxy compound to form the lignin-based biomass epoxy resin. Other parameters include the weight ratio of the lignin to the acid anhydride compound, the weight ratio of the lignin to the epoxy compound, the lignin species, the acid anhydride compound species, and the epoxy species are similar to above-mentioned, no longer repeat here.

According to the embodiments, the solvent can be ether such as ethylene glycol dibutyl ether, propylene glycol mono-methyl ether, diethylene glycol monomethyl ether, dipropylene glycol methyl ether, or anisole; ketone such as cyclohexanone, cyclopentanone, methyl ethyl ketone, diisobutyl ketone, methyl propyl ketone, or methyl iso-amyl ketone; ester such as propylene glycol mono-methyl ether acetate, mixed dibasic ester, ethyl acetate, n-butyl acetate, or isopropyl acetate; alcohol such as ethanol, isobutanol, or diacetone alcohol; amide such as dimethylformamide, or dimethylacetamide; or a combination thereof.

It should be noted that not any one step of (a), (b), and (c) needs adding catalyst. The catalyst includes Lewis acids such as p-benzenesulfonic acid or derivatives thereof (e.g. methylbenzenesulfonic acid, sulfuric acid, or a combination thereof).

According to the conventional methods for manufacturing lignin-based biomass epoxy resin, there are almost using the polyol with the anhydride compound for modifying the lignin. However, the polyol may compete with the lignin to react with the anhydride, leading the reducing of the amount of anhydride which reacting with the lignin, and resulting in poor properties of the products. To avoid the foregoing problem, the anhydride would react with the lignin, and then react with the polyol.

The lignin-based biomass epoxy resin, which obtained from the reactions mentioned above, has a chemical formula as follows:

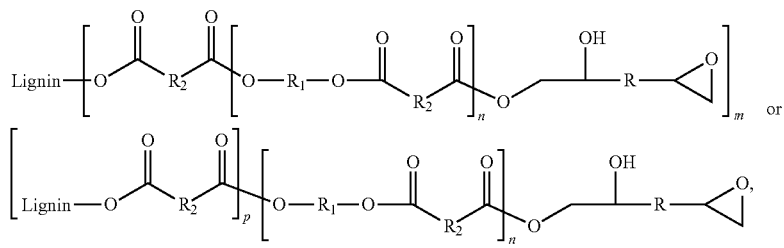

wherein Lignin is lignin; R is —CH$_2$OCH$_2$—, —CH$_2$O(CH$_2$)$_2$OCH$_2$—, —CH$_2$O(CH$_2$)$_4$OCH$_2$—,

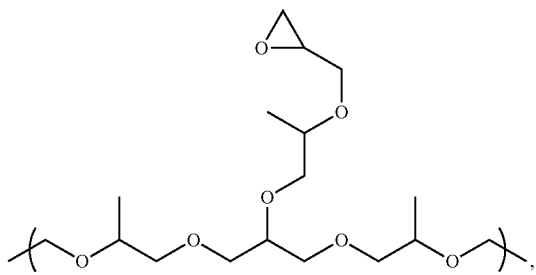

epoxidized soybean oil group, or a combination thereof; R$_1$ is C$_{2-8}$ alkanediyl group (e.g. —CH$_2$CH$_2$—, —CH$_2$CH$_2$CH$_2$CH$_2$—), —C$_{3-8}$ hydroxyl alkanediyl group (e.g. —CH$_2$CH(OH)CH$_2$—), or a combination thereof; R$_2$ is —CH=CH—,

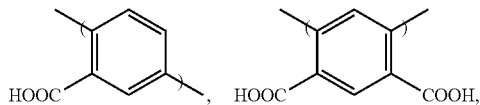

or a combination thereof; m is an integer from 1 to 10; n is an integer from 0 to 20; and, p is an integer from 1 to 5.

According to some embodiments, mixing 100 parts by weight of the lignin-based biomass epoxy resin, 0.5 to 1.5 (or 1.1 to 1.3) parts by weight of auxiliary, and 25 to 40 (or 30 to 40) parts by weight of crosslinking agent to form the lignin-based biomass epoxy resin composition for coating. An overly low amount of the auxiliary may cause defects (e.g. pinhole or shrinkage cavity) in the coating. An overly high amount of the auxiliary may influence the properties of the coating after sterilization tests or boiling water treatment and also influence the stability of coating. An overly low amount of the crosslinking agent may cause incompletely crosslinking and influence the properties of the coating. An overly high amount of the crosslinking agent may cause the coating become too hard and poor toughness to apply, and the residual unreacted crosslinking agent may also affect the stability of the coating.

Because of well compatibility with solvent, the solid content of the lignin-based biomass epoxy resin composition can be adjusted for applying on surface of a variety of metal substrates. The lignin-based biomass epoxy resin composition can be applied on the substrates such as glasses, ceramics, stones, plastics, metals, or polymers, and dried to form a film. The method of applying the bio-based epoxy composition on the substrates may be spin coating, immersion coating, brush coating, spray coating, roller coating, or a combination thereof. In some embodiments, the process of removing or drying the solvent of the bio-based epoxy composition is performed at a temperature of 180° C. to 220° C. for a period of 10 minutes to 30 minutes. The auxiliary may be polymeric additives, polyether modified organosilicon, polyether siloxane copolymer, organosilicon additives, silicon-free additives, poly acrylate additives, or a combination thereof. The crosslinking agent includes phenolic resin, amine, anhydride, polyamide resin, or biomass such as lignin, carbohydrate, starch, cellulose, or a combination thereof.

The source of lignin which used in the embodiments is large amount and stable. The lignin which modified with a simple method to improve compatibility and epoxidation reaction efficiency could be applied in epoxy coating of metal substrates. The bio-based epoxy coatings can replace the present petrochemical raw material epoxy coatings and develop no bisphenol A-based (BPA-free) epoxy coating used for inner paint of food cans.

Below, exemplary embodiments will be described in detail so as to be easily realized by a person having ordinary knowledge in the art. The disclosure concept may be embodied in various forms without being limited to the exemplary embodiments set forth herein. Descriptions of well-known parts are omitted for clarity.

EXAMPLES

Example 1 (All Amount of the Polyol Serving as the Second Polyol)

(a) 20 parts by weight of lignin (alkali-MKBH3445, commercially available from Aldrich), 20 parts by weight of ethylene glycol (EG), and 149 parts by weight of propylene glycol mono-methyl ether (PGME) were mixed to form a mixture. Subsequently, 38.95 parts by weight of maleic anhydride (MA) was added to the mixture, and heated to 120° C. and reacted for 3 hours, thereby the first intermediate product was obtained. (c) 74.68 parts by weight of multi-epoxy compound (BE-188, epoxy value of 0.5319 mol/100 g, commercially available from Chang Chun Grop) was dissolved in 40 parts by weight of PGME, and added to the first intermediate product, which reacted at 90° C. for 1 hour. After cooling down to room temperature, a homogeneous solution of the lignin-based biomass epoxy resin was obtained, which was a liquid dark brown solution.

2.4 g of crosslinking agent (8215-BX-50, commercially available from Eternal Company, Taiwan) and a suitable amount of polyether modified organosilicon auxiliary were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 190° C. for 15 minutes to form a film having a smooth and bright appearance, a pencil hardness of 2H, and an adhesiveness of 100/100 as measured by a cross cut tape test.

Example 2 (All Amount of the Polyol Serving as the Second Polyol)

(a) 40 parts by weight of lignin (commercially available from Laiher Company), 4 parts by weight of ethylene glycol (EG), and 98 parts by weight of dimethylacetamide (DMAc) were mixed to form a mixture. Subsequently, 4.78 parts by weight of trimellitic anhydride (TMA) was added to the mixture, and heated to 150° C. and reacted for 3 hours, thereby the first intermediate product was obtained. (c) 46.78 parts by weight of multi-epoxy compound (BE-188) was dissolved in 18 parts by weight of DMAc, and added to the first intermediate product, which reacted at 100° C. for 1 hour. After cooling down to room temperature, a homogeneous solution of the lignin-based biomass epoxy resin was obtained, which was a liquid dark brown solution.

1 g of crosslinking agent (Desmodur® BL 3175 SN, commercially available from Bayer) and a suitable amount of polyether modified organosilicon auxiliary were added to 4 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 190° C. for 11 minutes to form a film having a smooth and bright appearance, a pencil hardness of 3H, and an adhesiveness of 100/100 as measured by a cross cut tape test.

Example 3 (All Amount of the Polyol Serving as the Second Polyol)

(a) 20 Parts by Weight of Lignin (Commercially Available from Chung Hwa Pulp Corporation), 21 parts by weight of ethylene glycol (EG), and 191 parts by weight of dimethylacetamide (DMAc) were mixed to form a mixture. Subsequently, 69.41 parts by weight of 1,2,4,5-benzenetetracarboxylic anhydride (PMDA) was added to the mixture, and heated to 130° C. and reacted for 3 hours, thereby the first intermediate product was obtained. (c) 86.16 parts by weight of multi-epoxy compound (B22, epoxidized soybean oil, epoxy value of 0.4125 mol/100 g, commercially available from Chang Chun Grop) was dissolved in 50 parts by weight of DMAc, and added to the first intermediate product, which reacted at 90° C. for 1.5 hours. After cooling down to room temperature, a homogeneous solution of the lignin-based biomass epoxy resin was obtained, which was a liquid dark brown solution.

2.4 g of crosslinking agent (PR722, commercially available from Cytec Company) and a suitable amount of mixed auxiliary (contained polymeric additives and polyether modified organosilicon auxiliary) were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance, a pencil hardness of 3H, and an adhesiveness of 100/100 as measured by a cross cut tape test. After soaking in boiling water (100° C.) for 1 hour, the film had the same appearance and an adhesiveness of 40/100 as measured by a cross cut tape test. After sterilization tests, the film which placed under hot steam had the same appearance and an adhesiveness of 95/100 as measured by a cross cut tape test. And the other film which soaked in deionized water had the same appearance and an adhesiveness of 95/100 as measured by a cross cut tape test. The result of soaking in boiling water test shows that the coating is not suitable using for inner paint of food cans.

Example 4 (A Portion Amount of the Polyol Serving as the Second Polyol and the Remaining Part Serving as the First Polyol)

(a) 17 parts by weight of lignin (commercially available from Chung Hwa Pulp Corporation), 9.76 parts by weight of ethylene glycol (EG), and 163.2 parts by weight of dimethylacetamide (DMAc) were mixed to form a mixture. Subsequently, 58.9 parts by weight of 1,2,4,5-benzenetetracarboxylic anhydride (PMDA) was added to the mixture, and heated to 130° C. and reacted for 3 hours, thereby the first intermediate product was obtained. (b) 8.09 parts by weight of EG was dissolved in 8.5 parts by weight of DMAc, and added to the first intermediate product, which reacted at 130° C. for 2 hours, thereby the second intermediate product was obtained. (c) 73.35 parts by weight of multi-epoxy compound (B22, epoxidized soybean oil) was dissolved in 42.5 parts by weight of DMAc, and added to the second intermediate product, which reacted at 90° C. for 1.5 hours. After cooling down to room temperature, a homogeneous solution of the lignin-based biomass epoxy resin was obtained, which was a liquid dark brown solution.

2.4 g of crosslinking agent (PR722) and a suitable amount of mixed auxiliary (contained polymeric additives and polyether modified organosilicon auxiliary) were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance, a pencil hardness of 6H, and an adhesiveness of 100/100 as measured by a cross cut tape test. After soaking in boiling water (100° C.) for 1 hour, the film had the same appearance and an adhesiveness of 95/100 as measured by a cross cut tape test. After sterilization tests, the film which placed under hot steam had the same appearance and an adhesiveness of 90/100 as measured by a cross cut tape test. And the other film which soaked in deionized water had the same appearance and an adhesiveness of 90/100 as measured by a cross cut tape test. The results which passed all the testing standards show that the coating is suitable using for inner paint of food cans.

Example 5 (No Polyol)

(a) 20 parts by weight of lignin (commercially available from Chung Hwa Pulp Corporation) and 47 parts by weight of dimethylacetamide (DMAc) were mixed to form a mixture. Subsequently, 11.77 parts by weight of maleic anhydride (MA) was added to the mixture, and heated to 160° C. and reacted for 3 hours, thereby the first intermediate product was obtained. (c) 14.1 parts by weight of multi-epoxy compound (BE-188) was dissolved in 9 parts by weight of DMAc, and added to the first intermediate product, which reacted at 90° C. for 1 hours. After cooling down to room temperature, a homogeneous solution of the lignin-based biomass epoxy resin was obtained, which was a liquid dark brown solution.

2.4 g of crosslinking agent (8215-BX-50) and a suitable amount of polyether modified organosilicon auxiliary were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 190° C. for 15 minutes to form a film having a smooth and bright appearance, a pencil hardness of 2H, and an adhesiveness of 80/100 as measured by a cross cut tape test.

Example 6 (A Portion Amount of the Polyol Serving as the Second Polyol and the Remaining Part Serving as the First Polyol)

(a) 20 parts by weight of lignin (commercially available from Chung Hwa Pulp Corporation), 11.48 parts by weight of ethylene glycol (EG), and 192 parts by weight of dimethylacetamide (DMAc) were mixed to form a mixture. Subsequently, 69.31 parts by weight of 1,2,4,5-benzenetetracarboxylic anhydride (PMDA) was added to the mixture, and heated to 130° C. and reacted for 3 hours, thereby the first intermediate product was obtained. (b) 8.52 parts by weight of EG was dissolved in 10 parts by weight of DMAc, and added to the first intermediate product, which reacted at 130° C. for 2 hours, thereby the second intermediate product was obtained. (c) 96.29 parts by weight of multi-epoxy compound (B22, epoxidized soybean oil) was dissolved in 50 parts by weight of DMAc, and added to the second intermediate product, which reacted at 90° C. for 1.5 hours. After cooling down to room temperature, a homogeneous solution of the lignin-based biomass epoxy resin was obtained, which was a liquid dark brown solution.

72 g of crosslinking agent (PR722) and a suitable amount of mixed auxiliary (contained polymeric additives and polyether modified organosilicon auxiliary) were added to 240 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance, a pencil hardness of 3H, and an adhesiveness of 95/100 as measured by a cross cut tape test. After soaking in boiling water (100° C.) for 1 hour, the film had the same appearance and an adhesiveness of 90/100 as measured by a cross cut tape test. After sterilization tests, the film which placed under hot steam had the same appearance and an adhesiveness of 90/100 as measured by a cross cut tape test. And the other film which soaked in deionized water had the same appearance and an adhesiveness of 100/100 as measured by a cross cut tape test. The results which passed all the testing standards show that the coating is suitable using for inner paint of food cans.

Example 7 (All Amount of the Polyol Serving as the Second Polyol)

(a) 20 parts by weight of lignin (commercially available from Chung Hwa Pulp Corporation), 20 parts by weight of ethylene glycol (EG), and 177 parts by weight of dimethylacetamide (DMAc) were mixed to form a mixture. Subsequently, 62.32 parts by weight of maleic anhydride (MA) was added to the mixture, and heated to 160° C. and reacted for 3 hours, thereby the first intermediate product was obtained. (c) 74.68 parts by weight of multi-epoxy compound (BE-188) was dissolved in 40 parts by weight of DMAc, and added to the first intermediate product, which reacted at 90° C. for 1 hour. After cooling down to room temperature, a homogeneous solution of the lignin-based biomass epoxy resin was obtained, which was a liquid dark brown solution.

2.4 g of crosslinking agent, which was one of 8215-BX-50, BL-3175-SN, and Cymel 303 (commercially available from Cytec Company), and a suitable amount of polyether modified organosilicon auxiliary were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 190° C. for 15 minutes to form a film. All of the films prepared from the three crosslinking agents have a smooth and bright appearance. The film prepared from 8215-BX-50 had a pencil hardness of 4H and an adhesiveness of 100/100 as measured by a cross cut tape test. The film prepared from BL-3175-SN had a pencil hardness of 2H and an adhesiveness of 90/100 as measured by a cross cut tape test. The film prepared from Cymel 303 had a pencil hardness of 2H and an adhesiveness of 0/100 as measured by a cross cut tape test.

Example 8 (All Amount of the Polyol Serving as the First Polyol)

(a) 20 parts by weight of lignin (commercially available from Chung Hwa Pulp Corporation) and 181 parts by weight of propylene glycol mono-methyl ether (PGME) were mixed to form a mixture. Subsequently, 69.41 parts by weight of 1,2,4,5-benzenetetracarboxylic anhydride (PMDA) was added to the mixture, and heated to 120° C. and reacted for 3 hours, thereby the first intermediate product was obtained. (b) 21 parts by weight of EG was dissolved in 10 parts by weight of PGME, and added to the first intermediate product, which reacted at 120° C. for 2 hours, thereby the second intermediate product was obtained. (c) 86.16 parts by weight of multi-epoxy compound (B22, epoxidized soybean oil) was dissolved in 50 parts by weight of PGME, and added to the second intermediate product, which reacted at 90° C. for 1.5 hours. After cooling down to room temperature, a homogeneous solution of the lignin-based biomass epoxy resin was obtained, which was a liquid dark brown solution.

2.4 g of crosslinking agent (PR722) and a suitable amount of mixed auxiliary (contained polymeric additives and polyether modified organosilicon auxiliary) were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance, a pencil hardness of 4H, and an adhesiveness of 95/100 as measured by a cross cut tape test. After soaking in boiling water (100° C.) for 1 hour, the film had the same appearance and an adhesiveness of 100/100 as measured by a cross cut tape test. After sterilization tests, the film which placed under hot steam had the same appearance and an adhesiveness of 95/100 as measured by a cross cut tape test. And the other film which soaked in deionized water had the same appearance and an adhesiveness of 95/100 as measured by a cross cut tape test. The results which passed all the testing standards show that the coating is suitable using for inner paint of food cans.

Example 9 (All Amount of the Polyol Serving as the Second Polyol)

(a) 10 parts by weight of lignosulfonate (DP651, commercially available from Borregaard), 6 parts by weight of ethylene glycol (EG), 20 parts by weight of 1,4-butanediol (BD), and 138 parts by weight of dimethylacetamide (DMAc) were mixed to form a mixture. Subsequently, 60.83 parts by weight of 1,2,4,5-benzenetetracarboxylic anhydride (PMDA) was added to the mixture, and heated to 140° C. and reacted for 3 hours, thereby the first intermediate product was obtained. (c) 44.93 parts by weight of multi-epoxy compound (ethylene glycol diglycidyl ether (EGDE), commercially available from TCI) was dissolved in 35 parts by weight of DMAc, and added to the first intermediate product, which reacted at 110° C. for 1.5 hours. After cooling down to room temperature, a homogeneous solution of the lignin-based biomass epoxy resin was obtained, which was a liquid dark brown solution.

1 g of crosslinking agent (PR722) and a suitable amount of polyether modified organosilicon auxiliary were added to 4 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 190° C. for 11 minutes to form a film having a smooth and bright appearance, a pencil hardness of 3H, and an adhesiveness of 100/100 as measured by a cross cut tape test.

Example 10 (All Amount of the Polyol Serving as the Second Polyol)

(a) 20 parts by weight of lignosulfonate (DP651), 20 parts by weight of ethylene glycol (EG), and 190 parts by weight of dimethylacetamide (DMAc) were mixed to form a mixture. Subsequently, 66.7 parts by weight of 1,2,4,5-benzenetetracarboxylic anhydride (PMDA) was added to the mixture, and heated to 130° C. and reacted for 3 hours, thereby the first intermediate product was obtained. (c) 92.65 parts by weight of multi-epoxy compound (B22, epoxidized soybean oil) was dissolved in 58 parts by weight of DMAc, and added to the first intermediate product, which reacted at 90° C. for 1.5 hours. After cooling down to room temperature, a homogeneous solution of the lignin-based biomass epoxy resin was obtained, which was a liquid dark brown solution.

4.8 g of crosslinking agent (PR722) and a suitable amount of mixed auxiliary (mixture of polymeric additives) were added to 16 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance. After soaking in boiling water (100° C.) for 1 hour, the film had the same appearance and an adhesiveness of 100/100 as measured by a cross cut tape test. After sterilization tests, the film which placed under hot steam had the same appearance and an adhesiveness of 40/100 as measured by a cross cut tape test. And the other film which soaked in deionized water had the same appearance and an adhesiveness of 100/100 as measured by a cross cut tape test. The cross cut tape test result of the film which placed under hot steam shows that the coating is not suitable using for inner paint of food cans.

Example 11 (A Portion Amount of the Polyol Serving as the Second Polyol and the Remaining Part Serving as the First Polyol)

(a) 20 parts by weight of lignosulfonate (DP651), 12.4 parts by weight of ethylene glycol (EG), and 190 parts by weight of dimethylacetamide (DMAc) were mixed to form a mixture. Subsequently, 66.7 parts by weight of 1,2,4,5-benzenetetracarboxylic anhydride (PMDA) was added to the mixture, and heated to 130° C. and reacted for 3 hours, thereby the first intermediate product was obtained. (b) 7.6 parts by weight of EG was added to the first intermediate product and reacted at 130° C. for 2 hours, thereby the second intermediate product was obtained. (c) 92.65 parts by weight of multi-epoxy compound (B22, epoxidized soybean oil) was dissolved in 58 parts by weight of DMAc, and added to the second intermediate product, which reacted at 90° C. for 1.5 hours. After cooling down to room temperature, a homogeneous solution of the lignin-based biomass epoxy resin was obtained, which was a liquid dark brown solution.

4.8 g of crosslinking agent (PR722) and a suitable amount of mixed auxiliary (mixture of polymeric additives) were added to 16 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance. After soaking in boiling water (100° C.) for 1 hour, the film had the same appearance and an adhesiveness of 100/100 as measured by a cross cut tape test. After sterilization tests, the film which placed under hot steam had the same appearance and an adhesiveness of 100/100 as measured by a cross cut tape test. And the other film which soaked in deionized water had the same appearance and an adhesiveness of 100/100 as measured by a cross cut tape test. The results which passed all the testing standards show that the coating is suitable using for inner paint of food cans.

Example 12 (A Portion Amount of the Polyol Serving as the Second Polyol and the Remaining Part Serving as the First Polyol)

(a) 20 parts by weight of lignosulfonate (DP651), 12.4 parts by weight of ethylene glycol (EG), and 173 parts by weight of dimethylacetamide (DMAc) were mixed to form a mixture. Subsequently, 66.7 parts by weight of 1,2,4,5-benzenetetracarboxylic anhydride (PMDA) was added to the mixture, and heated to 130° C. and reacted for 3 hours, thereby the first intermediate product was obtained. (b) 7.6 parts by weight of EG was dissolved in 10 parts by weight of DMAc, and added to the first intermediate product, which reacted at 130° C. for 2 hours, thereby the second intermediate product was obtained. (c) 46.32 parts by weight of multi-epoxy compound (B22, epoxidized soybean oil) was dissolved in 20 parts by weight of DMAc, and added to the second intermediate product, which reacted at 90° C. for 1.5 hours. After cooling down to room temperature, a homogeneous solution of the lignin-based biomass epoxy resin was obtained, which was a liquid dark brown solution.

6 g of crosslinking agent (PR722) and a suitable amount of mixed auxiliary (contained polymeric additives and polyether modified organosilicon auxiliary) were added to 16 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance. After soaking in boiling water (100° C.) for 1 hour, the film had the same appearance and an adhesiveness of 90/100 as measured by a cross cut tape test. After sterilization tests, the film which placed under hot steam had the same appearance and an adhesiveness of 80/100 as measured by a cross cut tape test. And the other film which soaked in deionized water had the same appearance and an adhesiveness of 100/100 as measured by a cross cut tape test. The results which passed all the testing standards show that the coating is suitable using for inner paint of food cans.

Example 13 (All Amount of the Polyol Serving as the First Polyol)

(a) 40 parts by weight of lignin (commercially available from Stora Enso Company) and 139 parts by weight of propylene glycol mono-methyl ether (PGME) were mixed to form a mixture. Subsequently, 19.65 parts by weight of 1,2,4,5-benzenetetracarboxylic anhydride (PMDA) and 35.34 parts by weight of maleic anhydride (MA) were added to the mixture, and heated to 130° C. and reacted for 3 hours, thereby the first intermediate product was obtained. (b) 10 parts by weight of ethylene glycol (EG) was dissolved in 10 parts by weight of PGME, and added to the first intermediate product, which reacted at 130° C. for 2 hours, thereby the second intermediate product was obtained. (c) 32.78 parts by weight of multi-epoxy compound (B22, epoxidized soybean oil) was dissolved in 20 parts by weight of PGME, and added to the second intermediate product, which reacted at 90° C. for 1.5 hours. After cooling down to room temperature, a homogeneous solution of the lignin-based biomass epoxy resin was obtained, which was a liquid dark brown solution.

2.4 g of crosslinking agent (PR722) and a suitable amount of mixed auxiliary (contained polymeric additives and polyether modified organosilicon auxiliary) were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance, a pencil hardness of 3H, and an adhesiveness of 100/100 as measured by a cross cut tape test. After soaking in boiling water (100° C.) for 1 hour, the film had the same appearance and an adhesiveness of 100/100 as measured by a cross cut tape test. After sterilization tests, the film which placed under hot steam had the same appearance and an adhesiveness of 100/100 as measured by a cross cut tape test. And the other film which soaked in deionized water had the same appearance and an adhesiveness of 100/100 as measured by a cross cut tape test. The results which passed all the testing standards show that the coating is suitable using for inner paint of food cans.

Example 14 (All Amount of the Polyol Serving as the Second Polyol)

(a) 40 parts by weight of lignin (commercially available from Stora Enso Company), 10 parts by weight of ethylene glycol (EG), and 174 parts by weight of cyclohexanone were mixed to form a mixture. Subsequently, 19.65 parts by weight of 1,2,4,5-benzenetetracarboxylic anhydride (PMDA) and 35.34 parts by weight of maleic anhydride (MA) were added to the mixture, and heated to 130° C. and reacted for 3 hours, thereby the first intermediate product was obtained. (c) 49.14 parts by weight of multi-epoxy compound (B22, epoxidized soybean oil) was dissolved in 20 parts by weight of cyclohexanone, and added to the first intermediate product, which reacted at 90° C. for 1.5 hours. After cooling down to room temperature, a homogeneous solution of the lignin-based biomass epoxy resin was obtained, which was a liquid dark brown solution.

2.4 g of crosslinking agent (PR722) and a suitable amount of mixed auxiliary (contained polymeric additives and polyether modified organosilicon auxiliary) were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance, a pencil hardness of 3H, and an adhesiveness of 100/100 as measured by a cross cut tape test.

Example 15 (All Amount of the Polyol Serving as the Second Polyol)

(a) 80 parts by weight of lignin (commercially available from Stora Enso Company), 20 parts by weight of ethylene glycol (EG), 298.33 parts by weight of cyclohexanone, and 59.67 parts by weight of methyl ethyl ketone (MEK) were mixed to form a mixture. Subsequently, 39.3 parts by weight of 1,2,4,5-benzenetetracarboxylic anhydride (PMDA) and 70.68 parts by weight of maleic anhydride (MA) were added to the mixture, and heated to 130° C. and reacted for 3 hours, thereby the first intermediate product was obtained. (c) 163.84 parts by weight of multi-epoxy compound (B22, epoxidized soybean oil) was dissolved in 83.33 parts by weight of cyclohexanone and 16.67 parts by weight of MEK, and added to the first intermediate product, which reacted at 90° C. for 1.5 hours. After cooling down to room temperature, a homogeneous solution of the lignin-based biomass epoxy resin was obtained, which was a liquid dark brown solution.

2.4 g of crosslinking agent (PR722) and a suitable amount of mixed auxiliary (contained polymeric additives and polyether modified organosilicon auxiliary) were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance, a pencil hardness of 3H, and an adhesiveness of 100/100 as measured by a cross cut tape test.

Example 16 (All Amount of the Polyol Serving as the Second Polyol)

(a) 40 parts by weight of lignin (commercially available from Stora Enso Company), 10 parts by weight of ethylene glycol (EG), 127.86 parts by weight of propylene glycol mono-methyl ether (PGME), 25.57 parts by weight of methyl ethyl ketone (MEK), and 25.57 parts by weight of diisobutyl ketone (DIBK) were mixed to form a mixture. Subsequently, 19.65 parts by weight of 1,2,4,5-benzenetetracarboxylic anhydride (PMDA) and 35.34 parts by weight of maleic anhydride (MA) were added to the mixture, and heated to 130° C. and reacted for 3 hours, thereby the first intermediate product was obtained. (c) 81.92 parts by weight of multi-epoxy compound (B22, epoxidized soybean oil) was dissolved in 33.33 parts by weight of MEK and 16.67 parts by weight of DIBK, and added to the first intermediate product, which reacted at 90° C. for 2 hours. After cooling down to room temperature, a homogeneous solution of the lignin-based biomass epoxy resin was obtained, which was a liquid dark brown solution.

2.4 g of crosslinking agent (PR722) and a suitable amount of mixed auxiliary (contained polymeric additives and polyether modified organosilicon auxiliary) were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance, a pencil hardness of 3H, and an adhesiveness of 100/100 as measured by a cross cut tape test.

Example 17 (All Amount of the Polyol Serving as the Second Polyol)

(a) 40 parts by weight of lignin (commercially available from Stora Enso Company), 10 parts by weight of ethylene glycol (EG), 149.17 parts by weight of propylene glycol mono-methyl ether (PGME), and 29.83 parts by weight of propylene glycol mono-methyl ether acetate (PGMEA) were mixed to form a mixture. Subsequently, 19.65 parts by weight of 1,2,4,5-benzenetetracarboxylic anhydride (PMDA) and 35.34 parts by weight of maleic anhydride (MA) were added to the mixture, and heated to 130° C. and reacted for 3 hours, thereby the first intermediate product was obtained. (c) 81.92 parts by weight of multi-epoxy compound (B22, epoxidized soybean oil) was dissolved in 41.67 parts by weight of PGME and 8.33 parts by weight of PGMEA, and added to the first intermediate product, which reacted at 100° C. for 2 hours. After cooling down to room temperature, a homogeneous solution of the lignin-based biomass epoxy resin was obtained, which was a liquid dark brown solution.

2.4 g of crosslinking agent (PR722) and a suitable amount of mixed auxiliary (contained polymeric additives and polyether modified organosilicon auxiliary) were added to 8 g of the lignin-based biomass epoxy resin solution. After stirring for a moment, the lignin-based biomass epoxy resin composition having a solid content of 35-50% was obtained. The lignin-based biomass epoxy resin composition was coated on the tinplate sheet and solidified at 210° C. for 15 minutes to form a film having a smooth and bright appearance, a pencil hardness of 3H, and an adhesiveness of 100/100 as measured by a scotch tape test.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method for manufacturing a lignin-based biomass epoxy resin, comprising:
    (a) mixing a lignin, an acid anhydride compound, and a solvent to form a mixture and reacting to form a first intermediate product, wherein the mixture consists of the lignin, the acid anhydride compound, and the solvent;
    (b) mixing the first intermediate product with a first polyol in the absence of an epoxy compound to form a second mixture and reacting to forma a second intermediate product;
    (c) reacting the second intermediate product with an epoxy compound to form the lignin-based biomass epoxy resin, wherein the first polyol is not lignin.

2. The method as claimed in claim 1, wherein the lignin comprises alkali lignin, lignosulfonate, organosolv lignin, or a combination thereof.

3. The method as claimed in claim 1, wherein the lignin and the acid anhydride compound have a weight ratio of 1:0.1 to 1:6.5, and the acid anhydride compound comprises maleic anhydride, 1,2,4,5-benzenetetracarboxylic anhydride, trimellitic anhydride, derivatives thereof, or a combination thereof.

4. The method as claimed in claim 1, wherein the lignin and the first polyol have a weight ratio of 1:0.1 to 1:2, and the first polyol comprises diol, triol, or a combination thereof.

5. The method as claimed in claim 1, wherein the lignin and the epoxy compound have a weight ratio of 1:0.7 to 1:5, and the epoxy compound comprises glycidyl ether, diglycidyl ether, bisphenol A diglycidyl ether, epoxidized vegetable oil, derivatives thereof, or a combination thereof.

6. The method as claimed in claim 1, wherein the solvent comprises ether, ketone, ester, alcohol, amide, or a combination thereof.

* * * * *